(12) United States Patent
Geertman (10) Patent No.: US 10,757,949 B1
(45) Date of Patent: Sep. 1, 2020

(54) POULTRY STUNNING SYSTEM AND METHOD

(71) Applicant: Midway Machine Technologies, Inc., Zeeland, MI (US)

(72) Inventor: Terry B. Geertman, West Olive, MI (US)

(73) Assignee: Midway Machine Technologies, Inc., Zeeland, MI (US)

( * ) Notice: Subject to any disclaimer, the term of this patent is extended or adjusted under 35 U.S.C. 154(b) by 41 days.

(21) Appl. No.: 16/163,057

(22) Filed: Oct. 17, 2018

Related U.S. Application Data (60) Provisional application No. 62/573,672, filed on Oct. 17, 2017.

(51) Int. Cl.
| | |
|---|---|
| *A22B 3/00* | (2006.01) |
| *A22B 3/08* | (2006.01) |
| *A22B 5/02* | (2006.01) |
| *A22B 7/00* | (2006.01) |
| *A22C 21/00* | (2006.01) |

(52) U.S. Cl.
CPC ............. *A22B 3/005* (2013.01); *A22B 3/086* (2013.01); *A22B 5/02* (2013.01); *A22B 7/001* (2013.01); *A22C 21/0015* (2013.01)

(58) Field of Classification Search
CPC ............. A22B 3/00; A22B 3/005; A22B 3/10
USPC .................................................... 452/65, 66
See application file for complete search history.

(56) References Cited

U.S. PATENT DOCUMENTS

| | | | |
|---|---|---|---|
| 6,848,987 B2* | 2/2005 | Draft | A22B 3/005 452/66 |
| 7,448,943 B1* | 11/2008 | Woodford | A22B 3/005 452/66 |
| 7,771,255 B2* | 8/2010 | Cattaruzzi | A22B 3/00 452/57 |
| 8,272,926 B2 | 9/2012 | Lang et al. | |
| 8,323,080 B2* | 12/2012 | Lang | A22B 3/086 452/57 |

(Continued)

OTHER PUBLICATIONS

Karczewski,. "CO2 stunning is considered one of the most reliable slaughter methods in terms of animal welfare and meat quality," Meat + Poultry, Nov. 2016, pp. 25-33.

(Continued)

*Primary Examiner* — Richard T Price, Jr.
(74) *Attorney, Agent, or Firm* — Gardner, Linn, Burkhart & Ondersma LLP (57) ABSTRACT

A method and system for stunning poultry with carbon dioxide gas includes initially establishing an initial elevated $CO_2$ concentration in an initial stun chamber, and then lowering a cage for live poultry downwardly through an open top of the initial stun chamber. The cage is held there for an initial time period, after which the cage is moved into an intermediate stun chamber, where an intermediate elevated $CO_2$ concentration is established. The cage is held in the intermediate stun chamber for an intermediate period of time, after which it is moved into a final stun chamber, where a final elevated $CO_2$ concentration is established. The cage is held in the final stun chamber for a final period of time, and the cage is then raised upwardly through an open top of the final stun chamber and out into an ambient atmosphere.

19 Claims, 3 Drawing Sheets

(56) References Cited

U.S. PATENT DOCUMENTS 8,591,297 B2 * 11/2013 Lang .................. A22B 1/00
452/66

OTHER PUBLICATIONS

Dimarcantonio-Brown, "Michigan turkey producers wins food quality award," Jun. 2010, pp. 23-25, 27, and 29, Retrieved from foodquality.com.

* cited by examiner

POULTRY STUNNING SYSTEM AND METHOD

CROSS REFERENCE TO RELATED APPLICATION

The present application claims the filing benefits of U.S. provisional application Ser. No. 62/573,672, filed Oct. 17, 2017, which is hereby incorporated by reference herein in its entirety.

FIELD OF THE INVENTION

The present invention relates to devices and methods for controlled-atmosphere-stunning (CAS) of poultry, such as chickens, at a poultry processing plant.

BACKGROUND OF THE INVENTION

Controlled atmosphere stunning of chicken, turkeys, and other poultry is a process used at the incoming or intake end of a poultry processing plant, in which a breathable non-oxygen gas is substituted for at least a portion of the atmospheric air that is initially in and around the cage or containment area for the poultry, to thereby deplete that local atmosphere of oxygen. Commonly used non-oxygen gases include nitrogen and carbon dioxide, both of which are found in atmospheric air. For animal welfare and meat quality purposes, it is desirable for the poultry or livestock to breathe the oxygen-depleted atmosphere without becoming alarmed or attempting to escape their confines, which can result in unintended harm to the animals and reduced meat quality due to bruising and broken legs or wings. From a plant production efficiency standpoint, it is preferred for the stunning process to take place as quickly and humanely as possible, while minimizing the wasting of breathable non-oxygen gas.

SUMMARY OF THE INVENTION

The present invention provides a poultry stunning system and method in which poultry in cages are moved through multiple stages of controlled atmosphere stunning (CAS) with increasing concentrations of carbon dioxide ($CO_2$), or possibly another non-oxygen gas or blend of non-oxygen gases, while minimizing losses of the $CO_2$ or other non-oxygen gas(es). This results in a rapid induction phase in which the animals willingly breathe in the initial local atmosphere containing elevated $CO_2$, substantially without resistance or showing signs of stress or escape actions, and are relaxed as they take further breaths and begin to lose consciousness. The animals then progress to subsequent chambers of the stunning system, having more elevated levels of $CO_2$, until a final chamber is reached, at which point the animals are in a state of "irreversible stun." With the animals in a state of irreversible stun, they can be removed from the final chamber and moved to an area having a normal atmosphere, and the animals will not regain consciousness. The irreversibly stunned animals can then be handled manually by plant personnel, who can shackle the stunned animals to a "shackle line" or conveyor system that moves the animals to a slaughter area and then on to subsequent processing.

In one form of the present invention, a poultry stunning system includes an initial stun chamber, an intermediate stun chamber, and a final stun chamber, a carbon dioxide system, gas sensors, and a controller. The initial stun chamber has an open or openable intake region that receives a poultry cage, plus an initial openable panel that permits the poultry cage to be moved out of the initial stun chamber and into the intermediate stun chamber. The intermediate stun chamber has an upstream end near the initial openable panel, and a downstream end defined by an intermediate openable panel. The final stun chamber is positioned to receive the poultry cage from the intermediate stun chamber, and the final stun chamber includes an open or openable discharge region that permits the discharge of the poultry cage. The carbon dioxide system includes a plurality of carbon dioxide conduits in fluid communication with a carbon dioxide source and with respective stun chambers. A gas sensor is positioned in each stun chamber and is operable to generate a gas signal indicative of a carbon dioxide concentration in the respective stun chamber. Each carbon dioxide conduit has a control valve that is operable to selectively permit carbon dioxide gas to flow into respective ones of the stun chambers in response to a respective control signal received from the controller. In addition to being in electronic communication with each of the control valves, the controller receives signals from each of the gas sensors, so that the controller can generate the respective control signals in response to the respective gas signals for each stun chamber.

According to one aspect, the initial stun chamber includes an initial conveyor floor surface for moving the poultry cage out of the initial stun chamber, and the intermediate stun chamber includes an intermediate conveyor floor surface for moving the poultry cage out of the intermediate stun chamber. Optionally, the final stun chamber includes a final conveyor floor surface that is operable to receive the poultry cage from the intermediate conveyor floor surface and to position the cage in a desired location within the final stun chamber.

According to another aspect, each of the initial and intermediate stun chambers includes a mixing fan that can be energized to mix gases of the respective chamber atmospheres in the initial and intermediate stun chambers.

According to still another aspect, the open or openable intake region of the initial stun chamber is at an upper portion of the initial stun chamber, and the open or openable discharge region of the final stun chamber is at an upper portion of the final stun chamber. Optionally, a powered lift system is provided at the final stun chamber and is operable to raise the poultry cage up and out through the open or openable discharge region.

According to a further aspect, there are at least two of the intermediate stun chambers, which are positioned side-by-side, and both of the intermediate stun chambers are disposed between the initial stun chamber and the final stun chamber.

According to a still further aspect, there are at least three of the intermediate stun chambers. A first of the intermediate stun chambers is open to the initial stun chamber when the initial openable panel is open, a second of the intermediate stun chambers is open to the first intermediate stun chamber when the intermediate openable panel of the first intermediate stun chamber is open, a third of the intermediate stun chambers is open to the second intermediate stun chamber when the intermediate openable panel of the second intermediate stun chamber is open, and the final stun chamber is open to the third intermediate stun chamber when the intermediate openable panel of the third intermediate stun chamber is open.

According to yet another aspect, the controller is operable to establish (i) an initial elevated carbon dioxide concentration in the initial stun chamber, (ii) a first intermediate elevated carbon dioxide concentration in the first intermediate stun chamber, (iii) a second intermediate elevated carbon dioxide concentration in the second intermediate stun chamber, (iv) a third intermediate elevated carbon dioxide concentration in the third intermediate stun chamber, and (v) a final elevated carbon dioxide concentration in the final stun chamber. The final elevated carbon dioxide concentration is higher than the third intermediate elevated carbon dioxide concentration, the third intermediate carbon dioxide concentration is higher than the second intermediate elevated carbon dioxide concentration, the second intermediate carbon dioxide concentration is higher than the first intermediate elevated carbon dioxide concentration, and the first intermediate elevated carbon dioxide concentration is higher than the initial elevated carbon dioxide concentration.

Optionally, the initial elevated carbon dioxide concentration is about 18% to 35%, the first intermediate elevated carbon dioxide concentration is about 31% to 43%, the second intermediate elevated carbon dioxide concentration is about 45% to 63%, the third intermediate elevated carbon dioxide concentration is about 62% to 82%, and the final elevated carbon dioxide concentration is about 76% to 100%.

In another form of the present invention, a method is provided for stunning poultry with carbon dioxide gas. The method includes establishing an initial elevated concentration of carbon dioxide in an initial stun chamber; lowering a cage adapted to contain live poultry downwardly through an open top of the initial stun chamber and holding the cage in the initial stun chamber for an initial time duration; receiving the cage into an intermediate stun chamber; establishing an intermediate elevated concentration of carbon dioxide in the intermediate stun chamber and holding the cage in the intermediate stun chamber for an intermediate time duration; receiving the cage into a final stun chamber; establishing a final elevated concentration of carbon dioxide in the final stun chamber and holding the cage in the final stun chamber for a final time duration; and raising the cage upwardly through an open top of the final stun chamber and into an ambient atmosphere.

Therefore, the poultry stunning system and method of the present invention enables poultry processors to humanely and efficiently stun live poultry animals, such as chickens, for subsequent processing using breathable non-oxygen gas such as carbon dioxide. By selecting a suitable initial concentration breathable non-oxygen gas, the live poultry will calmly breathe in the air having elevated levels of $CO_2$ or other breathable non-oxygen gas, and will eventually lose consciousness, without showing obvious signs of stress or resistance during the process. Subsequent chambers having more elevated levels of $CO_2$ or other breathable non-oxygen gas permit an operator to achieve an "irreversible stun" condition, prior to further processing.

These and other objects, advantages, purposes and features of the present invention will become apparent upon review of the following specification in conjunction with the drawings.

DESCRIPTION OF THE PREFERRED EMBODIMENTS

Figure 1:
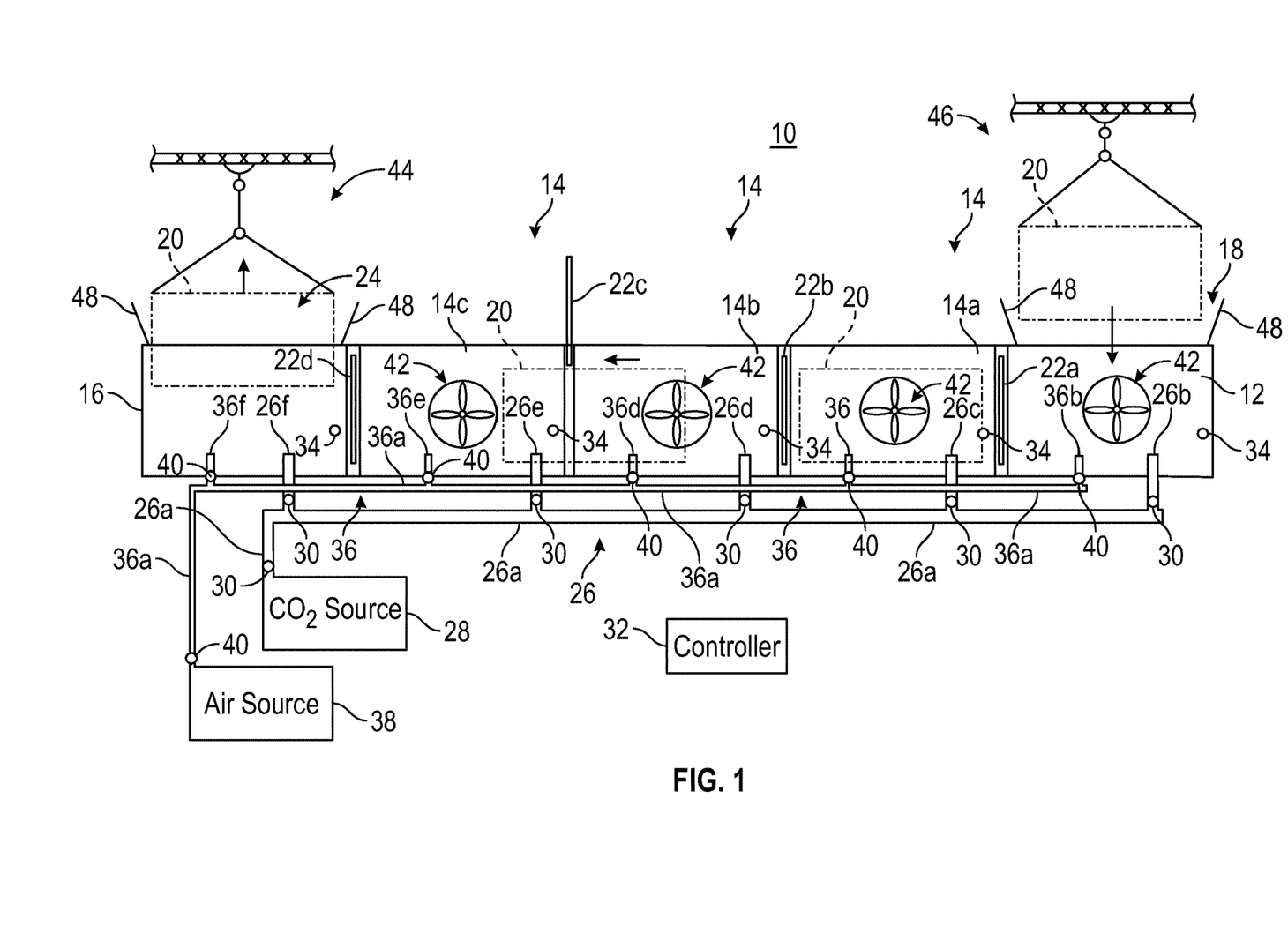
FIG. 1 is a diagrammatic side elevation of a poultry stunning system in accordance with the present invention.
Figure 2:
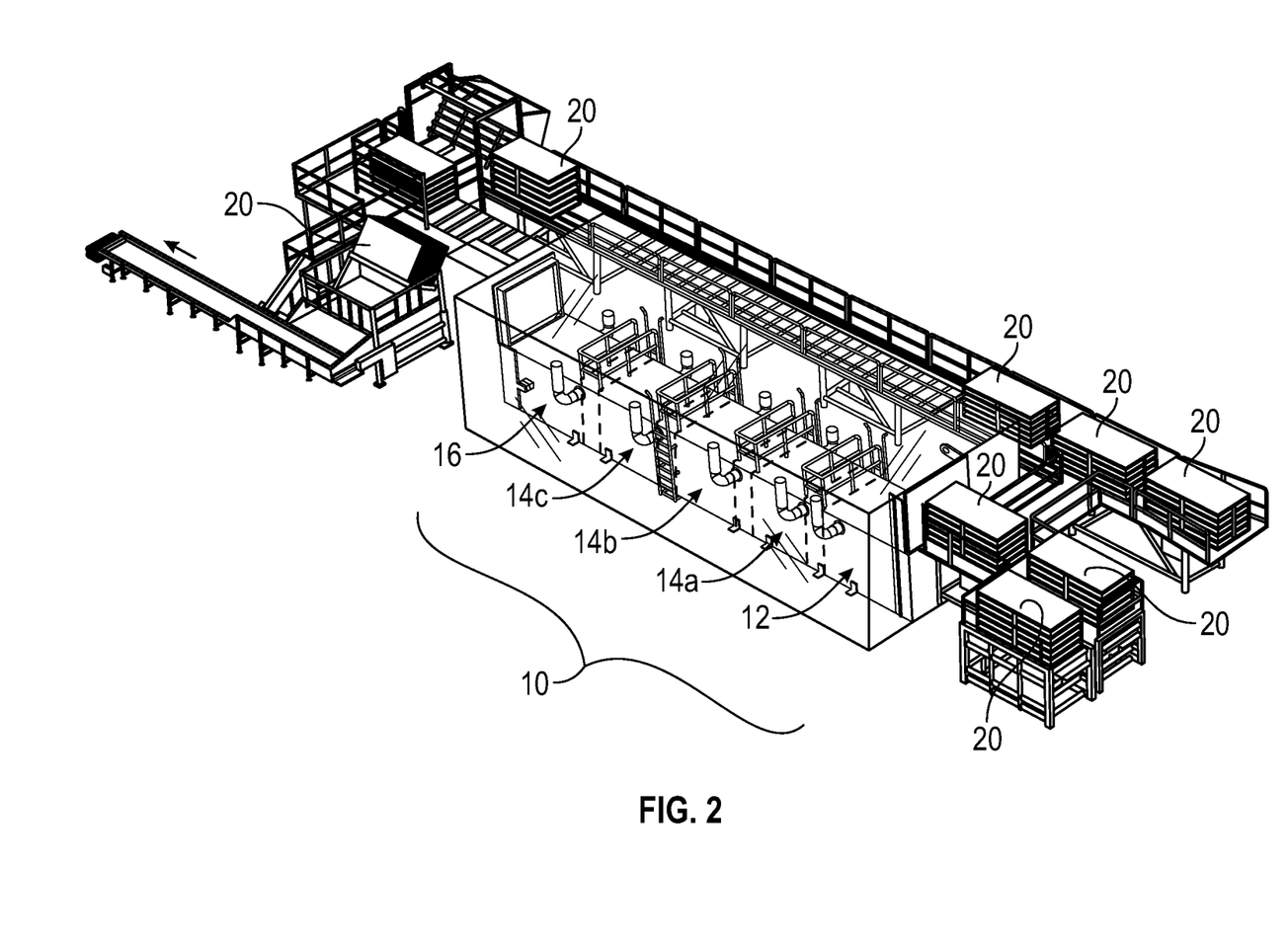
FIG. 2 is a perspective view of a poultry intake and shackling system of a processing plant, which can incorporate the poultry stunning system of FIG. 1.

Referring now to the drawings and the illustrative embodiments depicted therein, a poultry stunning system 10 includes an initial stun chamber 12, a plurality of intermediate stun chambers 14, and a final stun chamber 16, all in a substantially horizontal arrangement, such as shown in FIG. 1. Initial stun chamber 12 includes an open or openable upper intake region 18 that is configured to receive live poultry (typically contained in a cage 20) in a downward direction from above. An initial openable side wall or panel 22a permits discharge of the cage 20 out of the initial stun chamber 12 and into a first intermediate stun chamber 14a. Subsequent intermediate openable side walls or panels 22b-d permit movement of the cage 20 from the first intermediate stun chamber 14a to a second intermediate stun chamber 14b, then to a third intermediate stun chamber 14c, and finally to the final stun chamber 16. The final stun chamber 16 receives the cage 20 from the third intermediate stun chamber 14c via the most downstream intermediate openable side wall or panel 22d. The final stun chamber 16 has an open or openable upper discharge region 24 that permits the cage 20 to be discharged in an upward direction (FIG. 1).

In the illustrated embodiment, intermediate stun chambers 14 include three distinct chambers 14a-c as noted above, each of which has a respective upstream end in the direction of initial stun chamber 12 and a respective downstream end in the direction of final stun chamber 16, with a respective openable side wall or panel 22a or 22b or 22c or 22d disposed between each of the adjacent chambers. Although the stun chambers 12, 14, 16 are illustrated in a linear horizontal arrangement, it will be appreciated that different arrangements are possible without departing from the spirit and scope of the present invention. For example, if linear space is limited in an installation area, the flow direction may be reversed part way through the system, such as by placing an intermediate stun chamber side-by-side with the preceding stun chamber and then reversing direction to the subsequent stun chamber so that the cages enter the final stun chamber travelling in substantially the opposite direction from the direction in which they exited the initial stun chamber. It will further be appreciated that although three intermediate stun chambers 14a-c are illustrated, greater or fewer stun chambers may be used for a given application. It will further be appreciated that the stun chambers may be arranged along a common horizontal plane, as shown, or may be arranged on at least a slight incline from horizontal, although it will be appreciated that it is generally desirable to maintain cages 20 in a horizontal orientation, and so it may be desirable to provide a mechanism or the like to achieve a level orientation for the cages when there is more than a slight incline along the stunning system.

A carbon dioxide manifold 26 includes a main conduit 26a and respective chamber-feed conduits 26b-f for each of the initial stun chamber 12, the intermediate stun chambers 14a-c, and the final stun chamber 16. Main carbon dioxide conduit 26a is in fluid communication with a carbon dioxide source 28. A plurality of actuatable carbon dioxide valves 30 permit a controller 32 to direct the flow of carbon dioxide into each of the stun chambers individually. Optionally, and as shown in FIG. 1, one of the carbon dioxide valves 30 is disposed along main conduit 26a between carbon dioxide source 28 and the final stun chamber's feed conduit 26f, and may be used to ensure there is no carbon dioxide flowing into any chamber, and/or may provide a regulating function to limit the gas pressure in manifold 26. Controller 32 is in electronic communication with a plurality of gas sensors 34 that are disposed in or at respective stun chambers. The gas sensors 34 are able to generate gas signals indicative of carbon dioxide concentration in each chamber's internal atmosphere, and send these signals to the controller 32 either via wired or wireless communications (not shown). Optionally, the gas sensors 34 are operable to detect the specific gravity of the chamber atmosphere in the respective stun chambers, which can be correlated to carbon dioxide concentration if desired. It will be appreciated that, for certain applications satisfactory results may be achieved using other breathable non-oxygen gases, such as nitrogen, in place of carbon dioxide.

Optionally, and as shown in FIG. 1, an air manifold 36 includes a main air conduit 36a and respective chamber-feed conduits 36b-f for each of the initial stun chamber 12, the intermediate stun chambers 14a-c, and the final stun chamber 16. Main air conduit 26a is in fluid communication with an air source 38, which could be a tank pressurized with atmospheric air, an atmospheric air intake and associated pump or fan, or the like. A plurality of actuatable air valves 40 permit controller 32 to direct the flow of air into each of the stun chambers 14 individually, in order to increase the concentration of oxygen-containing air and/or to decrease the carbon dioxide concentration in the chambers. Optionally, and as shown in FIG. 1, one of the air valves 40 is disposed along main conduit 36a between air source 38 and the final stun chamber's feed conduit 36f, and may be used to ensure there is no flow of air into any chamber, and/or may provide a regulating function to limit the gas pressure in manifold 36. It will be appreciated that pure oxygen or other breathable oxygen-containing gases may be used in place of air.

The initial stun chamber 12 and each of the intermediate stun chambers 14a-c includes a mixing fan 42 that is operated to mix the gases of the chamber and ensure a substantially homogenous local atmosphere mixture in each chamber. This is particularly important when cages 20 are multi-tiered, since carbon dioxide may otherwise tend to sink to the lowest elevation inside each chamber once introduced through one of the chamber-feed conduits 26b-f, creating a higher concentration of carbon dioxide at low elevation and a lower concentration at higher elevations. Mixing fans 42 are preferably quiet-operating fans that do not generate excessive airflow that would alarm or cause discomfort for the poultry contained in each cage, especially in the initial stun chamber 12 in which the poultry are fully conscious upon entry. In the illustrated embodiment, final stun chamber 16 lacks a fan, which may be unnecessary due to the relatively high concentration of carbon dioxide throughout final stun chamber 16. However, a fan may be provided in the final stun chamber 16 if desired.

Optionally, the initial stun chamber 12 includes an initial conveyor floor surface (not shown) that supports and is operable to move the cage 20 out of the initial stun chamber 12 and into the first intermediate stun chamber 14a. Likewise, each of the first intermediate stun chamber 14a, the second intermediate stun chamber 14b, and the third intermediate stun chamber 14c have their own respective conveyor floor surfaces that support and are operable to move the cages 20 into and out of the chambers. The final stun chamber 16 may also have a conveyor floor surface that supports and draws the cages 20 through the most downstream intermediate openable side wall or panel 22d and fully into the final stun chamber 16.

A powered lift system 44 is associated with the final stun chamber 16 and is operable to raise the cages 20 up and out through the open or openable upper discharge region 24. Optionally, a powered lowering system 46 is associated with the initial stun chamber 12 and operable to lower the cages 20 downwardly through the open or openable upper intake region 18. Powered lift system 44 and powered lowering system 46 may be overhead crane systems as shown, or may instead comprise robotic arms, scissor lifts or hydraulic or pneumatic lift systems, or substantially any suitable device capable of lowering and raising cages 20 into and out of the initial and final stun chambers, respectively. Optionally, the cages 20 may be directed into the initial stun chamber 12 from below or from a side thereof, and likewise cages 20 may be directed out of the final stun chamber 116 in a downward or sideways direction, and openable doors or panels may be provided to accommodate the desired directions of entry and exit.

Controller 32 is in electronic communication with each of the control valves 30, 40 and with each of the gas sensors 34. Controller 32 may also be capable of independently controlling openable side walls or panels 22a-d, and also the powered lift system 44 and lowering system 46, the fans 42, and other features such as optional openable cover panels 48 at the top of initial stun chamber 12 and final stun chamber 16, the conveyor floor surfaces, and cameras (not shown) that may be positioned so as to provide a view into each cage 20 inside each stun chamber, for monitoring purposes. Cameras may be used to generate images of the poultry in respective stun chambers for display in a control booth that is associated with the poultry stun system, so that operators may monitor the poultry's welfare and adjust system settings as appropriate.

The controller 32 is operable to establish (i) an initial elevated carbon dioxide concentration in the initial stun chamber 12 that may have an anesthetic or numbing effect on the poultry, (ii) a first intermediate elevated carbon dioxide concentration in the first intermediate stun chamber 14a, (iii) a second intermediate elevated carbon dioxide concentration in the second intermediate stun chamber 14b, (iv) a third intermediate elevated carbon dioxide concentration in the third intermediate stun chamber 14c, and (v) a final elevated carbon dioxide concentration in the final stun chamber 16. The animals are typically moved from a normal atmosphere into the initial stun chamber 12 in which the initial $CO_2$ concentration is already elevated to the initial desired level, as opposed to gradually raising the $CO_2$ concentration from normal atmospheric level to the initial desired level while the animals are present in the chamber. Using this method and an initial $CO_2$ concentration of about 18% to 35% by mass, and more preferably from about 28% to 32% by mass, the $CO_2$ has been found to have an apparent numbing or anesthetic effect on the poultry animals in the initial stun chamber 12, such that the animals typically do not show signs of resistance, stress, or escape actions, and generally appear calm and relaxed as they take further breaths and begin to lose consciousness, prior to being moved to the first (or only) intermediate stun chamber.

The first intermediate elevated carbon dioxide concentration is preferably higher than the initial elevated carbon dioxide concentration, the second intermediate carbon dioxide concentration is preferably higher than the first intermediate elevated carbon dioxide concentration, the third intermediate carbon dioxide concentration is preferably higher than the second intermediate elevated carbon dioxide concentration, and the final elevated carbon dioxide concentration is preferably higher than the third intermediate elevated carbon dioxide concentration. For example, the initial elevated carbon dioxide concentration may range from about 18% to 35% by mass, the first intermediate elevated carbon dioxide concentration may range from about 31% to 43% by mass, the second intermediate elevated carbon dioxide concentration may range from about 45% to 63% by mass, the third intermediate elevated carbon dioxide concentration may range from about 62% to 82% by mass, and the final elevated carbon dioxide concentration may range from about 76% to 100% by mass.

Figure 3:
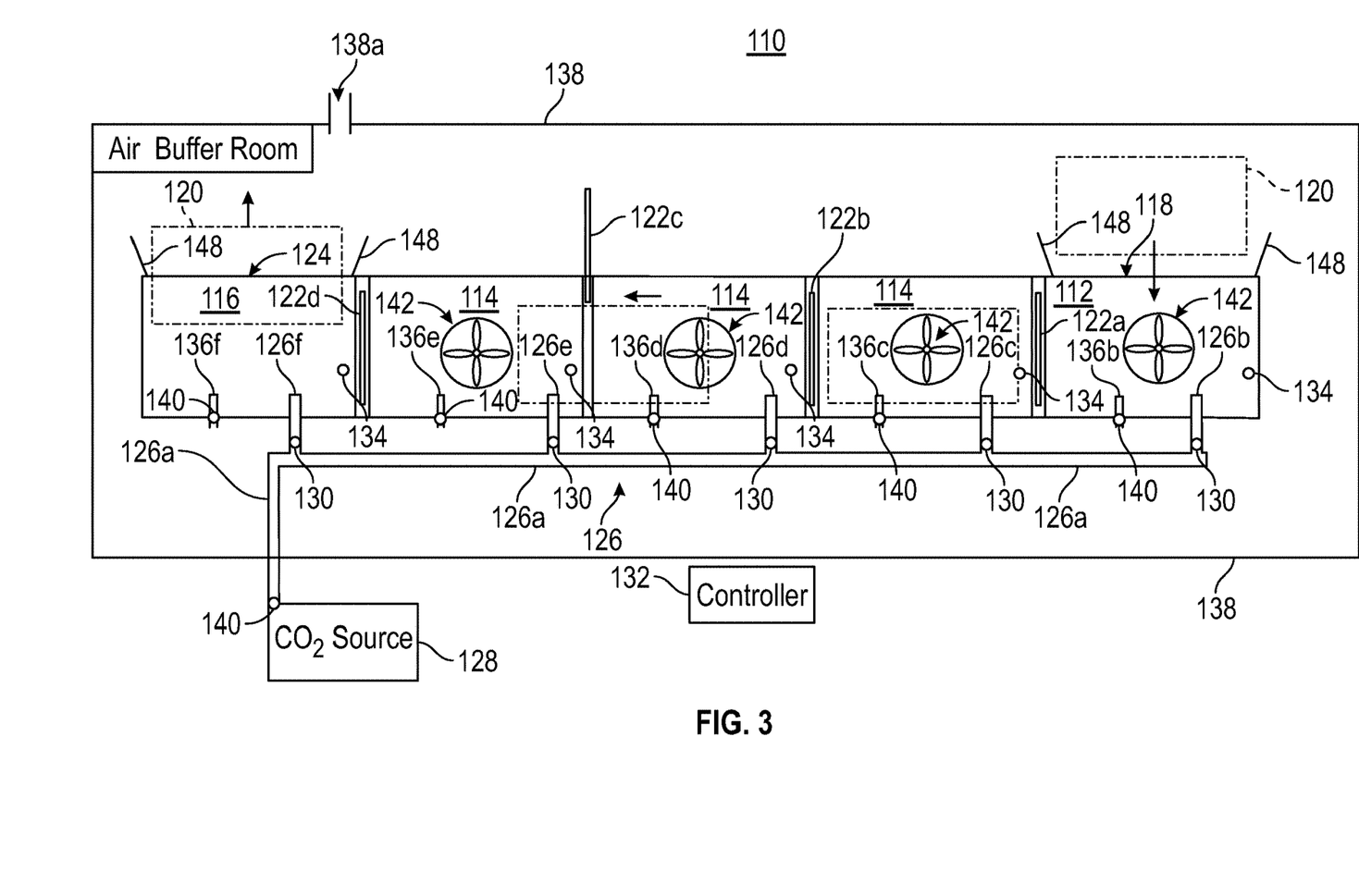
FIG. 3 is a diagrammatic side elevation of another poultry stunning system in accordance with the present invention.

Optionally, and as shown in FIG. 3, another poultry stunning system 110 includes an air buffer room 138 that provides similar functions as the air source 38 described above with reference to the poultry stunning system 10. Air buffer room 138 includes an atmospheric air inlet 138a, and substantially surrounds and contains the other components of the stunning system 110 including an initial stun chamber 112, a plurality of intermediate stun chambers 114, and a final stun chamber 116. Air entering the air buffer room 138 may be taken directly from the outdoor environment through suitable ductwork and without conditioning, or may be filtered, heated, cooled, humidified, or de-humidified as desired to achieve desirable environmental conditions surrounding the chambers 112, 114, 116. The air contained in the air buffer room 138 can be selectively directed into any one of the chambers 112, 114, 116, or into any desired combination of those chambers, through respective air feed conduits 136b-f. Each air feed conduit 136b-f is fitted with a respective air valve and/or pump 140 that admits air from the air buffer room 138 into the corresponding chamber, such as in response to a control 132 that generally corresponds to the controller 32 described in more detail above. Optionally, the chambers 112, 114, 116 may be vented through outlets (not shown) and back into the air buffer room 138 or to the outside atmosphere, as desired. Other components poultry stunning system 110 are substantially similar to like components of poultry stunning system 10 and are given like numerals by the addition of 100, such that the other various aspects of the poultry stunning system 110 of FIG. 3 will be readily understood with reference to the other descriptions contained herein.

Thus, the poultry stunning system of the present invention facilitates a method of stunning poultry with air containing increasingly elevated levels of carbon dioxide or other breathable non-oxygen gas. The method includes establishing an initial elevated concentration of carbon dioxide in an initial stun chamber 12, lowering one of the cage 20 downwardly through an open top 18 of the initial stun chamber 12 and holding the cage 20 in the initial stun chamber 12 for an initial time duration. The cage 20 is then moved into the first intermediate stun chamber 14a (and, optionally, to one or more additional stun chambers 14b, 14c), where an intermediate elevated concentration of carbon dioxide is established, whereupon the cage 20 is held in the first intermediate stun chamber 14a (or each individual stun chamber) for an intermediate time duration. The cage 20 is passed into the final stun chamber 16, where a final elevated concentration of carbon dioxide is established and the cage is held there for a final time duration. The cage is then raised upwardly through the open top 24 of the final stun chamber 16 and into the ambient atmosphere. The time duration in each stun chamber may be approximately seventy-five seconds, or may be substantially more or less, such as from about twenty seconds to ninety seconds or more. The optimal time durations may be selected according to carbon dioxide concentration in each chamber, as well as other factors such as observed poultry reactions during the stunning process.

It will be appreciated that lowering and raising cages 20 substantially vertically through open tops 18, 24 minimizes carbon dioxide losses to the ambient atmosphere, since carbon dioxide has a higher specific gravity than ambient air and will tend to remain in the stun chambers provided that a lower gas escape path is not provided, and provided that the cages are not moved with excessive speed into and out of the initial chamber 12 and final chamber 16, respectively. In addition, by opening only the upper regions of the initial stun chamber 12 and the final stun chamber 16 during intake and discharge (respectively) of the cages 20, the carbon dioxide concentration in each of these chambers can be more precisely maintained because the carbon dioxide (or the local chamber atmosphere having a high concentration of carbon dioxide, having a relatively high specific gravity), will tend to remain in the chambers even with cover panels 48 open.

Accordingly, the present invention provides a system and method for the humane and efficient stunning of poultry for subsequent processing. The live poultry animals willingly breathe in the gas having elevated levels of $CO_2$ or other breathable non-oxygen gas, and eventually lose consciousness, without showing obvious signs of stress or resistance during the process. By elevating the levels of $CO_2$ or other breathable non-oxygen gas in subsequent chambers, the poultry animals can be rendered unconscious to an "irreversible stun" condition, and readied for further processing.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A poultry stunning system comprising:
   an initial stun chamber comprising an open or openable top intake region configured to receive a poultry cage from above, and an initial openable side panel configured to permit discharge of the poultry cage in a lateral direction;
   an intermediate stun chamber having an upstream end and a downstream end, wherein said downstream end is defined by an intermediate openable panel;
   a final stun chamber configured to receive the poultry cage laterally from said intermediate stun chamber, wherein said final stun chamber comprises an open or openable top discharge region configured to permit the discharge of the poultry cage in a upward direction;
   a plurality of carbon dioxide conduits in fluid communication with a carbon dioxide source and with respective ones of said stun chambers;
   a gas sensor disposed in each of said stun chambers and operable to generate a gas signal indicative of a carbon dioxide concentration in a respective chamber atmosphere in one of said stun chambers;
   a control valve disposed along each of said carbon dioxide conduits and operable to selectively permit carbon dioxide gas to flow into respective ones of said stun chambers in response to a respective control signal; and
   a controller in electronic communication with each of said control valves and with each of said gas sensors, wherein said controller is operable to generate the respective control signals in response to the respective gas signals.

2. The poultry stunning system of claim 1, wherein said initial stun chamber comprises an initial conveyor floor surface that is operable to move the poultry cage out of said initial stun chamber, and said intermediate stun chamber comprises an intermediate conveyor floor surface that is operable to move the poultry cage out of said intermediate stun chamber.

3. The poultry stunning system of claim 2, wherein said final stun chamber comprises a final conveyor floor surface that is operable to receive the poultry cage from said intermediate conveyor floor surface.

4. The poultry stunning system of claim 1, wherein each of said initial and intermediate stun chambers comprises a mixing fan that is operable to mix gases of the respective chamber atmospheres in said initial and intermediate stun chambers.

5. The poultry stunning system of claim 1, further comprising a powered lift system associated with said final stun chamber and operable to raise the poultry cage up and out through said open or openable discharge region.

6. The poultry stunning system of claim 1, comprising at least two of said intermediate stun chambers positioned side-by-side and both of said intermediate stun chambers disposed between said initial stun chamber and said final stun chamber.

7. The poultry stunning system of claim 6, comprising three of said intermediate stun chambers, wherein:
    a first of said intermediate stun chambers is open to said initial stun chamber when said initial openable panel is open;
    a second of said intermediate stun chambers is open to said first intermediate stun chamber when said intermediate openable panel of said first intermediate stun chamber is open;
    a third of said intermediate stun chambers is open to said second intermediate stun chamber when said intermediate openable panel of said second intermediate stun chamber is open; and
    said final stun chamber is open to said third intermediate stun chamber when said intermediate openable panel of said third intermediate stun chamber is open.

8. The poultry stunning system of claim 7, wherein said controller is operable to establish (i) an initial elevated carbon dioxide concentration in said initial stun chamber, (ii) a first intermediate elevated carbon dioxide concentration in said first intermediate stun chamber, (iii) a second intermediate elevated carbon dioxide concentration in said second intermediate stun chamber, (iv) a third intermediate elevated carbon dioxide concentration in said third intermediate stun chamber, and (v) a final elevated carbon dioxide concentration in said final stun chamber, wherein said final elevated carbon dioxide concentration is higher than said third intermediate elevated carbon dioxide concentration, said third intermediate carbon dioxide concentration is higher than said second intermediate elevated carbon dioxide concentration, said second intermediate carbon dioxide concentration is higher than said first intermediate elevated carbon dioxide concentration, and said first intermediate elevated carbon dioxide concentration is higher than said initial elevated carbon dioxide concentration.

9. The poultry stunning system of claim 8, wherein said initial elevated carbon dioxide concentration is about 18% to 35%, said first intermediate elevated carbon dioxide concentration is about 31% to 43%, said second intermediate elevated carbon dioxide concentration is about 45% to 63%, said third intermediate elevated carbon dioxide concentration is about 62% to 82%, and said final elevated carbon dioxide concentration is about 76% to 100%.

10. The poultry stunning system of claim 1, wherein each of said stun chambers is arranged along a common horizontal plane.

11. The poultry stunning system of claim 1, wherein said gas sensors are operable to detect the specific gravity of the chamber atmosphere in the respective stun chambers.

12. The poultry stunning system of claim 1, in combination with the poultry cage, wherein said cage is sized and shaped to fit inside each of said stun chambers and to pass freely through or past (i) said open or openable intake region in an open configuration, (ii) said open or openable discharge region in an open configuration, (iii) said initial openable panel in an open configuration, and (iv) said intermediate openable panel in an open configuration.

13. The poultry stunning system of claim 1, wherein said controller is operable to establish an initial elevated carbon dioxide concentration in said initial stun chamber, an intermediate elevated carbon dioxide concentration in said intermediate stun chamber, and a final elevated carbon dioxide concentration in said final stun chamber, wherein said final elevated carbon dioxide concentration is higher than said intermediate elevated carbon dioxide concentration and said intermediate elevated carbon dioxide concentration is higher than said initial elevated carbon dioxide concentration.

14. The poultry stunning system of claim 1, further comprising a camera in each of said stun chambers, wherein said cameras are operable to generate images of poultry in respective ones of said stun chambers for display in a control booth associated with said poultry stun system.

15. The poultry stunning system of claim 1, further comprising:
    a lowering mechanism associated with said initial stun chamber and operable to lower the poultry cage downwardly through said open or openable intake region in an open configuration; and
    a raising mechanism associated with said final stun chamber and operable to raise the cage upwardly through said open or openable discharge region in an open configuration.

16. A method of stunning poultry with carbon dioxide gas, said method comprising:
    establishing an initial elevated concentration of carbon dioxide in an initial stun chamber;
    lowering a cage adapted to contain live poultry downwardly through an open top of the initial stun chamber and holding the cage in the initial stun chamber for an initial time duration;
    receiving the cage into an intermediate stun chamber;
    establishing an intermediate elevated concentration of carbon dioxide in the intermediate stun chamber and holding the cage in the intermediate stun chamber for an intermediate time duration;
    receiving the cage into a final stun chamber;
    establishing a final elevated concentration of carbon dioxide in the final stun chamber and holding the cage in the final stun chamber for a final time duration; and
    raising the cage upwardly through an open top of the final stun chamber and into an ambient atmosphere.

17. The method of claim 16, wherein said establishing the initial elevated concentration of carbon dioxide comprises elevating the initial elevated concentration of carbon dioxide to about 18% to 35%.

18. The method of claim 17, wherein said establishing the intermediate elevated concentration of carbon dioxide comprises elevating the initial elevated concentration of carbon dioxide to about 31% to 82%.

19. A method of stunning poultry with carbon dioxide gas, said method comprising:
- establishing an initial concentration of about 18% to 35% carbon dioxide in an initial stun chamber;
- lowering a cage adapted to contain live poultry downwardly through an open top of the initial stun chamber and holding the cage in the initial stun chamber for an initial time duration;
- receiving the cage into an intermediate stun chamber;
- establishing an intermediate elevated concentration of about 31% to 82% carbon dioxide in the intermediate stun chamber and holding the cage in the intermediate stun chamber for an intermediate time duration;
- receiving the cage into a final stun chamber;
- establishing a final elevated concentration of about 76% to 100% carbon dioxide in the final stun chamber and holding the cage in the final stun chamber for a final time duration; and
- discharging the cage upwardly through an open top of the final stun chamber and into an ambient atmosphere.

* * * * *